United States Patent
Tsai et al.

(10) Patent No.: US 8,510,254 B2
(45) Date of Patent: Aug. 13, 2013

(54) ONTOLOGY MODEL TO ACCELERATE ENGINEERING ANALYSIS IN MANUFACTURING

(75) Inventors: Ya-Jung Tsai, Sinpu Township (TW); Chih-Min Fan, Taipei (TW); Shi-Chung Chang, Taipei (TW); Hsiu-Chieh Cheng, Jhubei (TW); Fang-Hsiang Su, Taipei (TW); Wu-Chi Chen, Jhubei (TW); Ching-Pin Kao, Tainan (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 828 days.

(21) Appl. No.: 12/579,269

(22) Filed: Oct. 14, 2009

(65) Prior Publication Data

US 2010/0174396 A1 Jul. 8, 2010

Related U.S. Application Data

(60) Provisional application No. 61/233,063, filed on Aug. 11, 2009, provisional application No. 61/108,769, filed on Oct. 27, 2008.

(51) Int. Cl.
*G05B 13/04* (2006.01)
*G06F 17/00* (2006.01)

(52) U.S. Cl.
USPC .......................................................... 706/52

(58) Field of Classification Search
None
See application file for complete search history.

(56) References Cited

PUBLICATIONS

Su, Chang, Fan, Tsai, Jheng, Kao, and Lu, "A Novel Ontology-based Knowledge Engineering Approach for Yield Symptom Identificaiton in Semiconductor Manufacturing", 5th Annual Conference on Automation Science and Engineeirng, IEEE, 2009, pp. 433-438.*

Fan, Chang S., and Chang H., "Design of Collaborative Engineering Data Systems (CEDS: an Application Case of Process Integration," International Symposium on Semiconductor Manufacturing 2005, IEEE, 2005, pp. 43-46.*

Fan, Chang S., and Chang H., "Design of Collaborative Engineering Data Systems (CEDS): an Application Case of Process Integration," International Symposium on Semiconductor Manufacturing 2005, IEEE, 2005, pp. 43-46.*

Kitamura, Sasajima, Washio, Takafuji, Koji, Mizoguchi, "An Ontology-based Annotation Framework for Representing the Functionality of Engineering Devices", Proceedings of International Design Engineering Technical Conferences,. ASME 2006, Sep. 2006, pp. 1-10.*

Matheus, Baclawski, Kokar, Letkowski, "Using SWRL and OWL to Capture Domain Knowledge for a Situation Awareness Application Applied to a Supply Logistics Scenario", RuleML '5 Proceedings of the First International Confereonce on Rules and Rule Markup Languages for the Semantic Web, Springer-Verlag Berlin, Heidelberg, 2005, pp. 130-144.*

(Continued)

*Primary Examiner* — Kakali Chaki
*Assistant Examiner* — Walter Hanchak
(74) *Attorney, Agent, or Firm* — Slater & Matsil, L.L.P.

(57) ABSTRACT

An engineering analysis tool comprises a unified resource model-based (URM) objective and tool mapping capability for linking engineering analysis objectives to analysis tools. A Markov chain-based analysis plan generator (APTG) for reusing engineering analysis plans may be included in the engineering analysis tool. Further, the engineering analysis tool comprises a graphic symptom capturer (GSC) that auto-captures engineering perceived fault symptoms from engineering data analysis (EDA) tools.

27 Claims, 9 Drawing Sheets

(56) References Cited

PUBLICATIONS

Lee, Chang, Su, Fan, "Service Oriented Platform Design for Collaborative Engineering Data Analysis ISSM Pater: MC=P-235", International Symposium on Semiconductor Manufacturing, 2007, ISSM 2007 IEEE, Oct. 2007, pp. 1-4.*

International Technology Roadmap for Semiconductors, 2007 Edition, Yield Enhancement, 49 pages.

FAN, C-M, et al. "Design of Collaborative Engineering Data System (CEDS): an Application Case of Process Integration," IEEE, 2005, pp. 43-46.

Lee, J-R, et al. "Service Oriented Platform Design for Collaborative Engineering Data Analysis," International Symposium on Semiconductor Manufacturing Paper: MC-P-235, IEEE, 2007, 4 pages.

* cited by examiner

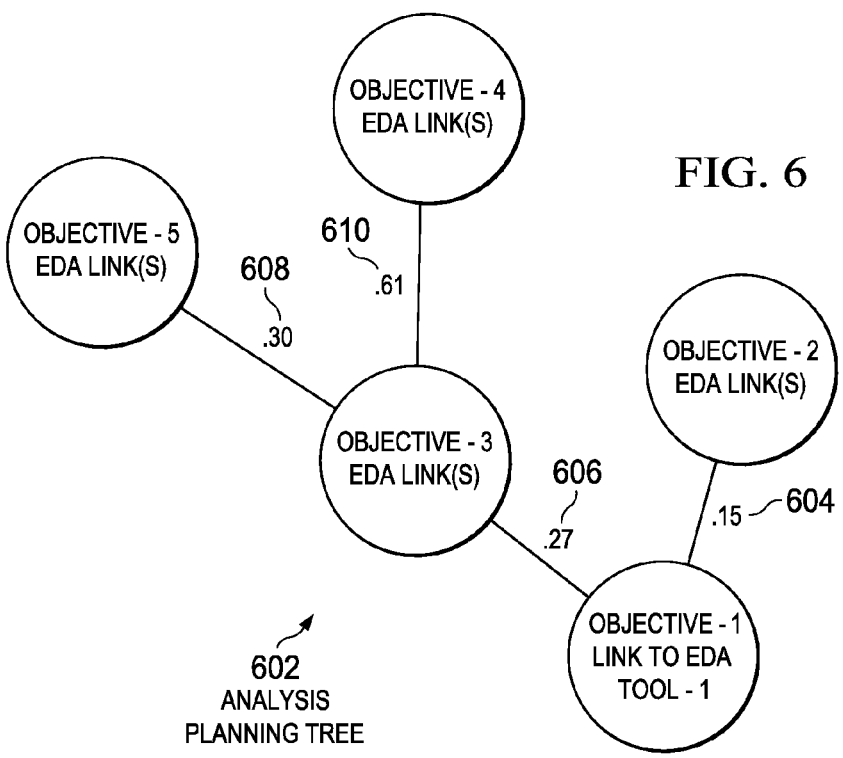
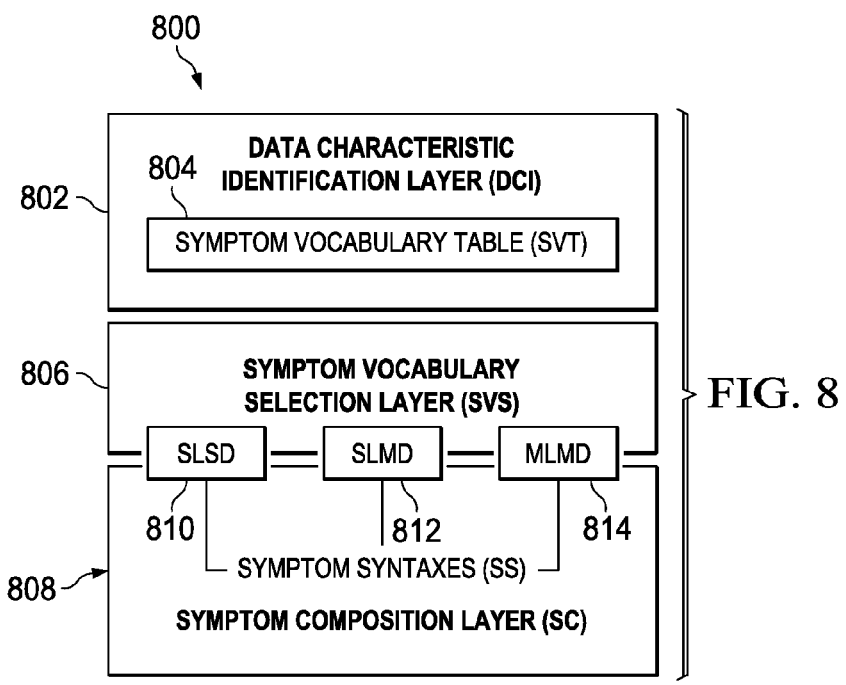

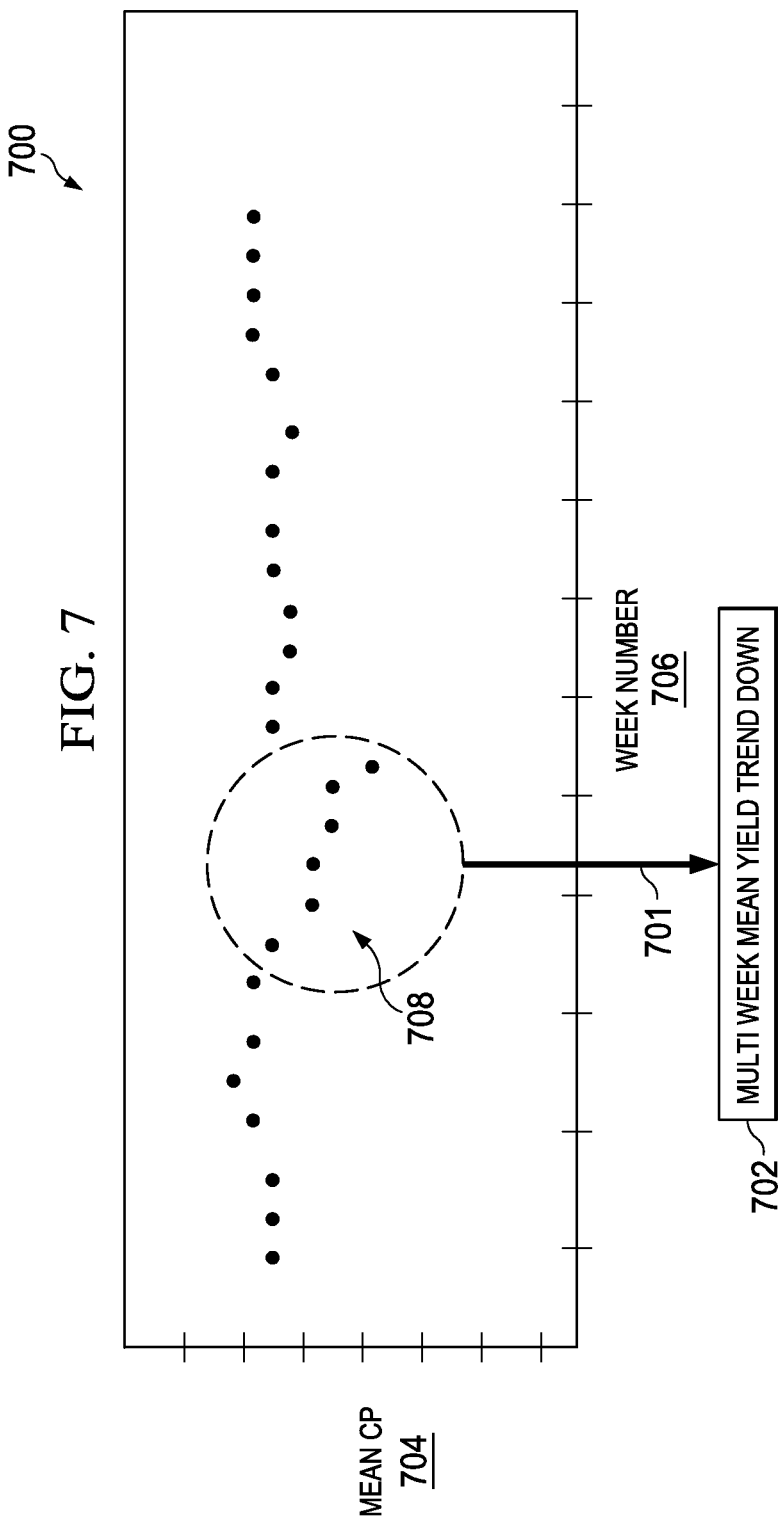

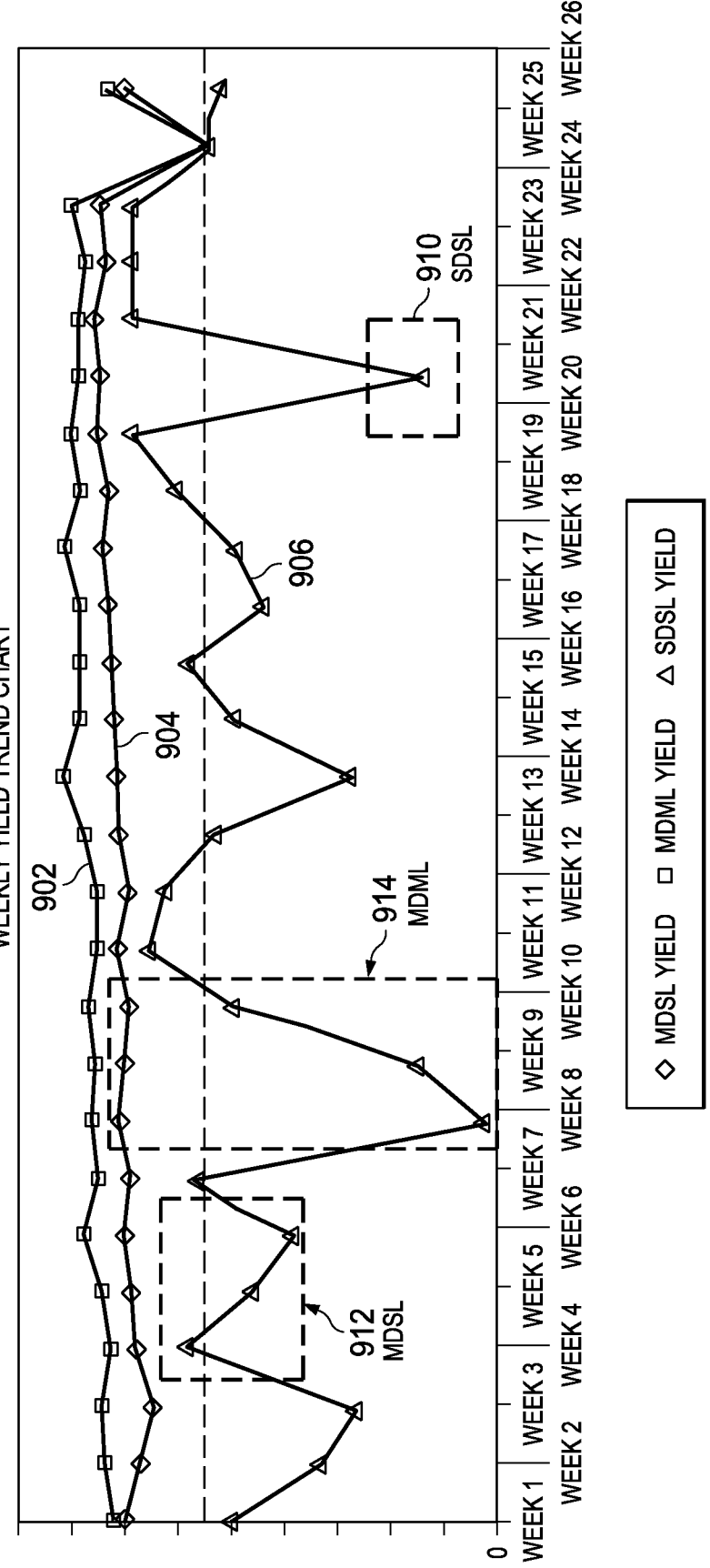

ONTOLOGY MODEL TO ACCELERATE ENGINEERING ANALYSIS IN MANUFACTURING

This application claims the benefit of U.S. Provisional Application No. 61/233,063, filed Aug. 11, 2009, entitled "An Ontology Model to Accelerate Engineering Analysis in Manufacturing," and U.S. Provisional Application No. 61/108,769, filed on Oct. 27, 2008, entitled "Novel Ontology Model to Accelerate Yield Improvement in Semiconductor Manufacturing," which applications are hereby incorporated herein by reference.

TECHNICAL FIELD

The present invention relates generally to a computer program product and method for engineering analysis in manufacturing, and more particularly to a computer program product and method for collecting, storing, and reusing engineering knowledge using an engineering ontology model.

BACKGROUND

Fast yield ramping shortens the cycle time from manufacturing to market. In semiconductor manufacturing challenges to fast yield ramping become more stringent because capital investments for semiconductor fabrication facilities (fabs) are sky rocketing while market demands change more rapidly and the manufacturing process, equipment, and operations become more complicated than before. The criticality of effectively managing knowledge intensive engineering analysis for fast yield ramping has grown significantly. To assist engineers in yield analysis, semiconductor fabs have adopted various platforms that provide tools for engineering data analysis (EDA).

Conventionally, triggered by a yield analysis event and an analysis objective, an engineer generates analysis objectives and a corresponding plan internally, and then selects and applies the appropriate EDA tools in sequence to perform the analysis according to the objectives plan to accomplish his/her objective. Typically, engineering experience in developing analysis plans has not been documented or if it is documented, it is documented in disparate documentation not easily reused. Engineering analysis procedures have not been systematically extracted nor stored for sharing and re-use.

Thus a disadvantage of the prior art is that the experience and knowledge of expert engineers may be lost over time and the learning curve of new engineers may be longer as a result.

Another disadvantage of the prior art methods is that experiments may be repeated because the knowledge of the experiment details and data are not adequately shared, thereby wasting resources, time and materials.

What is needed then, is mechanisms to overcome the above described shortcomings in the prior art.

SUMMARY OF THE INVENTION

These and other problems are generally solved or circumvented, and technical advantages are generally achieved by a system and method for collecting, storing, and reusing engineering knowledge using an engineering ontology model.

In accordance with an illustrative embodiment of the present invention, an engineering analysis tool is provided. The engineering analysis tool comprises an objective and tool mapping capability for linking engineering analysis objectives to analysis tools. An analysis plan generator (APTG) for reusing engineering analysis plans is included in the engineering analysis tool. Further, the engineering analysis tool comprises a graphic symptom capturer (GSC) that auto-captures engineering perceived fault symptoms from engineering data analysis (EDA) tools.

Advantages of the various embodiments of the present invention include providing a systematic method for storing the experience and knowledge of analysis planning A further advantage is the systematic storage of engineering analysis processes.

The foregoing has outlined rather broadly the features and technical advantages of an illustrative embodiment in order that the detailed description of the invention that follows may be better understood. Additional features and advantages of an illustrative embodiment will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the illustrative embodiments as set forth in the appended claims.

BRIEF DESCRIPTION OF THE DRAWINGS

For a more complete understanding of the illustrative embodiments, and the advantages thereof, reference is now made to the following descriptions taken in conjunction with the accompanying drawings, in which:

FIG. 6 shows a representation of an analysis planning tree (APT) in accordance with an embodiment;

FIG. 7 shows an example of a translation implemented by a graphic symptom capturer (GSC) module, such as GSC module 120 in FIG. 1;

FIG. 8 depicts a three-layered GSC illustrated by a block diagram in accordance with an embodiment;

FIG. 9 shows the three basic symptom syntax types, such as symptom syntaxes 812, 814, and 816 in FIG. 8 in accordance with an embodiment;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the present embodiments are discussed in detail below. It should be appreciated, however, that an illustrative embodiment provides many applicable inventive concepts that can be embodied in a wide variety of specific contexts. The specific embodiments discussed are merely illustrative of specific ways to make and use the invention, and do not limit the scope of the invention.

The present invention will be described with respect to illustrative embodiments in a specific context, namely an engineering analysis tool for semiconductor manufacturing. The invention may also be applied, however, to many other manufacturing and service environments.

Figure 1:
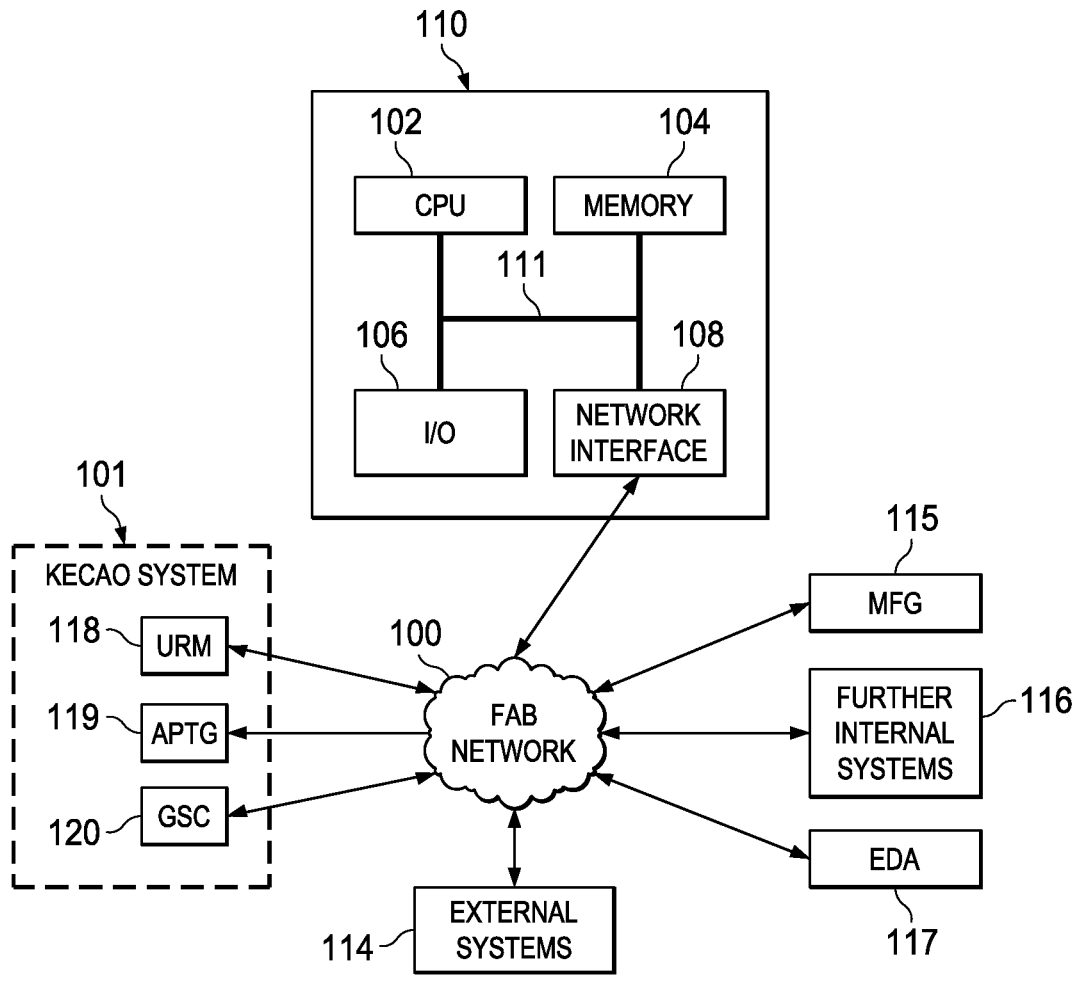
FIG. 1 shows an embodiment of a network in which a knowledge engineering and capture of analysis objective (KECAO) system 101 resides.

With reference now to FIG. 1, there is shown an embodiment of a network in which a knowledge engineering and capture of analysis objective (KECAO) system 101 resides. The KECAO system 101 may reside on computer 110, a system 114 external to fab network 100, an unnamed system 116 within fab network 100, or shared on all or any of the entities shown. In the example given, KECAO system 101 resides in separate databases and computers within fab network 100 for ease of illustration, however a data storage space is sufficient and any configuration of KECAO hardware and software is within the scope of the various embodiments.

Exemplary computer 110 may be any computer such as may be used within the fab network 100. The computer 110 may include a central processing unit (CPU) 102, a memory unit 104, an input/output (I/O) device 106, and a network interface 108. The network interface 108 may be, for example, one or more network interface cards (NICs). The components 102, 104, 106, and 108 are interconnected by a bus system 111. It is understood that the computer may be differently configured and that each of the listed components may actually represent several different components. For example, the CPU 102 may actually represent a multi-processor or a distributed processing system; the memory unit 104 may include different levels of cache memory, main memory, hard disks, and remote storage locations; and the I/O device 106 may include monitors, keyboards, and the like.

Computer 110 may be connected to fab network 100. Fab network 100 may be, for example, a complete network, a subnet of a local area network, a company wide intranet, the internet, or the like. Further, the entities connected to fab network 100 such as 114-120 may be connected first to other entities or to each other, before interconnection to fab network 100. The computer 110 may be identified on fab network 100 by an address or a combination of addresses, such as a media control access (MAC) address associated with the network interface 108 and an internet protocol (IP) address. Because the computer 110 may be connected to fab network 100, certain components may be shared with other devices, such as entities 114-120. Entities 114 and 116, for example, may be computers, personal data assistants, wired or cellular telephones, fab process equipment, probe equipment or any other device able to communicate with computer 110. Specifically external systems 114 is meant to represent any external systems in communication with fab network 100 and internal systems 116 is meant to represent any internal systems within the fab network 100 that is not called out herein.

Fab network 100 may include a plurality of entities 114-120 and the like. Fab network 100 may include a few or many interconnecting systems. The following description is intended as an example of an embodiment. It is well known that many other such examples exist, all of them within the scope of the various embodiments.

A manufacturing system and database including an event log is represented by MFG entity 115. The manufacturing system may comprise plurality of semiconductor equipment connected to the network through servos of a manufacture execution system (MES) or computer integrated manufacturing (CIM) system according to a well known Software Engineering Standards Committee (SESC) protocol. It is understood that the MES and SESC protocols are being discussed merely for the sake of example. MFG entity 115 may comprise all equipment and event logs, including lot, process, device, and product tracking. An illustrative embodiment of KECAO system 101 accesses the MFG 115 entity.

An engineering data analysis system and database is represented by EDA 117. EDA 117 comprises the capability and data necessary for many types of fab analysis tools including, for example, statistical process control SPC data, out of specification (OOS) information, wafer acceptance test (WAT) data, wafer level reliability (WLR) information, circuit probe (CP) data, defect maps, and analysis, other analytical tools, data and the like. Typically, these tools may be displayed in graphical form. An illustrative embodiment of KECAO system 101 accesses EDA 117.

URM 118 represents the equipment capability and interconnectivity of a unified resource model and system adapted to describe both the analysis objectives of the engineer and the EDA tools and functions of an engineering analysis plan (EAP), in an illustrative embodiment. In an alternate embodiment, URM 118 may represent a fault symptom language system of a type other than a unified resource model. On top of such representations, the mapping between engineering analysis objectives and EDA tool functions is established. URM is a knowledge representation system and language using a semantic network technique for specifying the classifications and relationships of EAP related data names involved in semiconductor manufacturing by nodes and node-links respectively. URM 118 may reside on a single computer in communication with fab network 100, a portion of a computer, or URM 118 may be shared across a number of computers. Further discussion of URM based systems and mapping will be discussed further in FIGS. 2 and 3.

APTG 119 represents the equipment capability and interconnectivity of an analysis planning tree generator. APTG 119 has the data and computing power to construct an analysis planning tree (APT). The initial analysis objective of the engineer acts as the root of the tree. An APT (not shown in FIG. 1) is a representation of the next analysis steps that may be taken to satisfy the initial analysis objective of the engineer. APTG 119 may reside on a single computer in communication with fab network 100, a portion of a computer, or APTG 119 may be shared across a number of computers. Further details of APTG processes will be discussed in FIGS. 4-6.

Graphic symptom capturer GSC 120 is designed to enable engineers to directly select the symptom patterns or failure modes they perceive over the EDA graphic charts they observe. The graphic symptom patterns are then translated by GSC 120 into text descriptions for knowledge storage and sharing. GSC 120 may reside on a single computer in communication with fab network 100, part of a computer, or GSC 120 may be shared across a number of computers. GSC will be discussed further in FIG. 5.

KECAO system 101 is shown with GSC 120, APTG 119, and URM 118 modules; however, KECAO system 101 may have only one such module or any combination of the three modules.

A drawback of the prior art is that the engineers typically use specific terms to describe their analysis objectives, mismatching the EDA tools that are usually defined in terms of their input and output data names. Hence, prior art methods may not be able to readily link an engineer's analysis objective with the appropriate EDA tool. Therefore, an engineer may not be able to find the tool that would be the most helpful in analysis. An illustrative embodiment solves this dilemma using an ontology model based on universal resource model URM.

Figure 2:
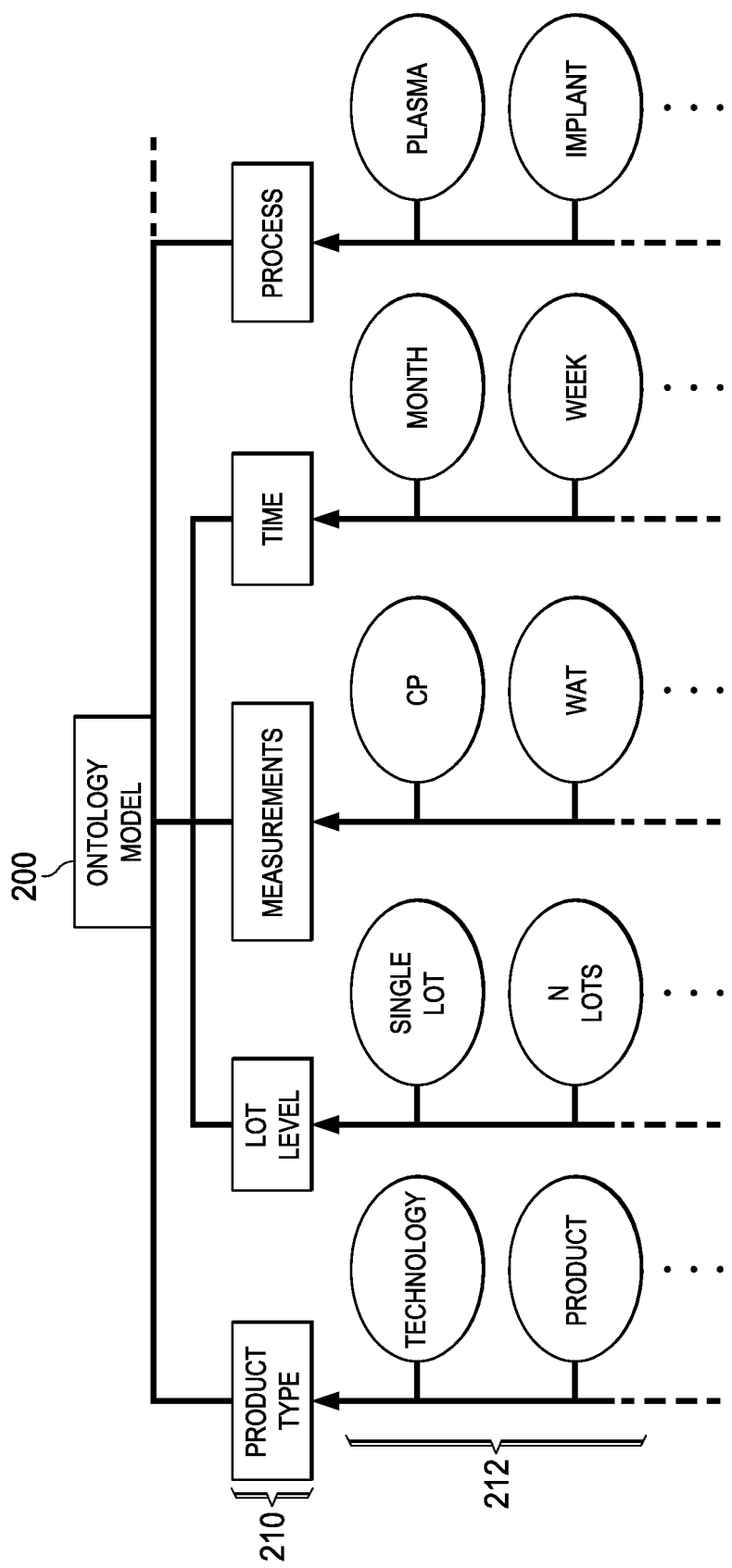
FIG. 2, a unified resource model-based (URM) module, such as URM module 118 in FIG. 1, is further described, in accordance with an embodiment.

Turning now to FIG. 2, the URM module, such as URM module 118 in FIG. 1, is further described. As stated above, the URM module is a knowledge representation language for specifying the classifications and relationships of EAP related data names by nodes, node-links, and node-types. Ontology model 200 represents the particular ontology model for an example embodiment. A node represents a specific data name; for example, the CP (circuit probe) data can be modeled as a node CP. Similar nodes with at least one common property can be classified as a node-type. For example, nodes of data named WAT (wafer acceptance test), BIN, and Inline parameters can all serve as nodes in the node-type termed "measurement" in an engineering analysis plan. As those of ordinary skill in the art will appreciate measurement and the nodes associated are just one example of many types of information that may be gathered over a large range of manufacturing and service environments.

In FIG. 2, the URM ontology model 200 shows five example node-types 210 identified for fab network 100, product-type, lot level, measurement, time, and process. Other example node types may include equipment, facility, service type or the like. Examples of individual nodes 212 are listed under each node type. Technology and product are listed nodes for node-type product-type. CP and WAT are listed nodes for node-type measurement, and so forth. Those of ordinary skill in the art will appreciate that the node-types 210 and nodes 212 may have different names and configurations in other embodiments.

Node-types 210 are generally consistent throughout the ontology model 200, however new node-types may be added, edited or deleted from the ontology model 200 as needed. Nodes nested under the product node-type may include product classification concepts such as part, branch, metal-layer, technology, and the like. Nodes nested under the time node-type may include concepts of time frame/range and grouping levels, such as quarterly, monthly, weekly, daily, and the like. Nodes nested under the Lot Node-Type may include concepts of data grouping levels, such as lot, wafer, site, wafer-site, zone etc. Nodes nested under the measurement node-type may include different kinds of measurement such as CP, WAT, Metrology, and the like. Nodes nested under the process node-type may include process related concepts such as recipe, step, stage, routing, and the like. Measurement from these example node-types, engineering objectives and EDA tools of analysis may be described. The tools provided by an EDA module (not shown), such as EDA module 117 in FIG. 1, are described using the same node-types and node names as the fab system in which the EDA module resides in an illustrative embodiment of Ontology model 200.

Figure 3:
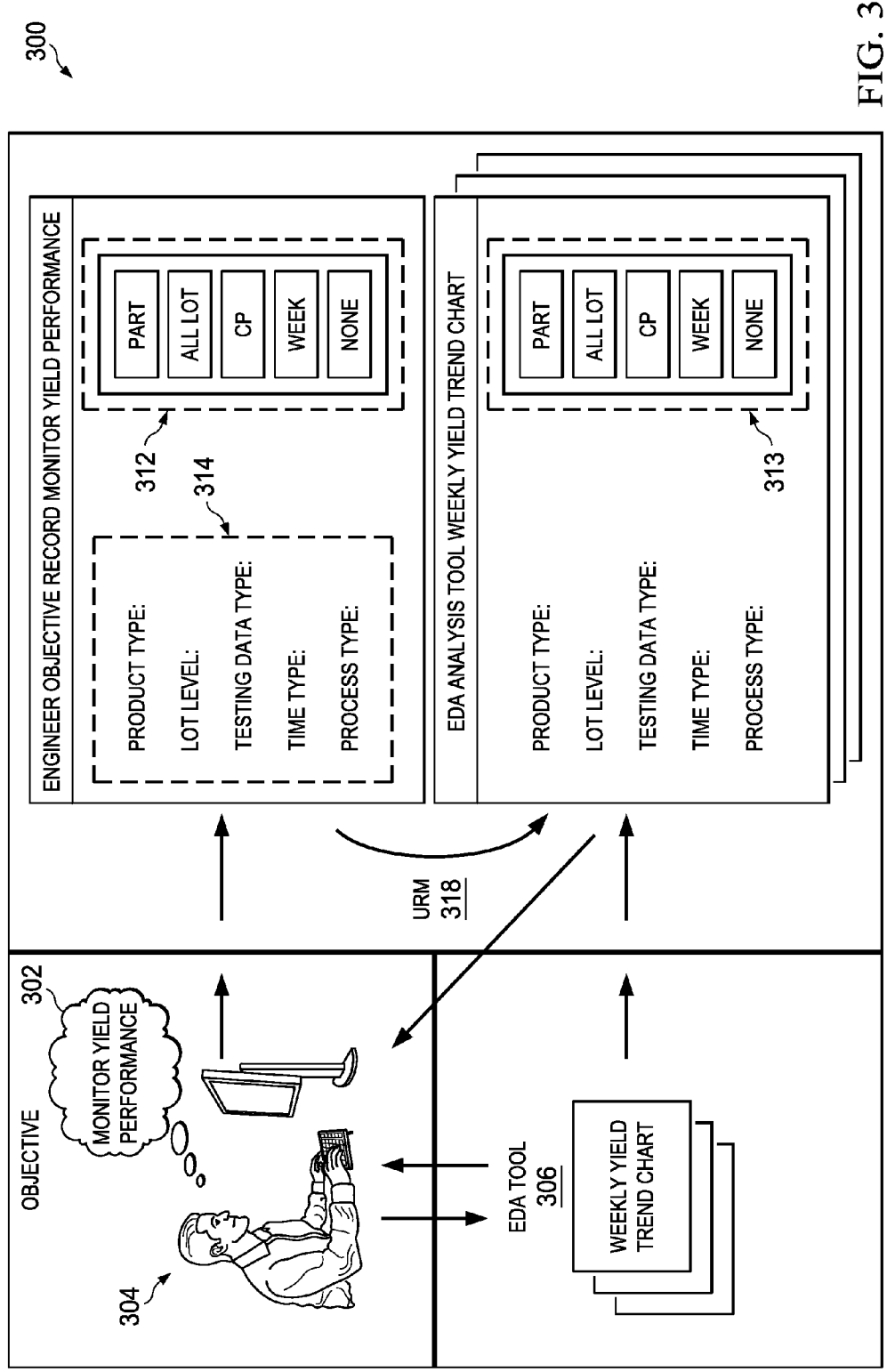
FIG. 3 shows a simple example use of a URM module.

FIG. 3 shows a simple example use of URM module, such as URM module 118, in FIG. 1. An engineer has an initial analysis objective, which in this example case, analysis objective 302 is to monitor yield performance. Using computer 304 the engineer logs into fab network 300 and proceeds to define his/her analysis objective. The engineer will select a node 312 for each node-type 314 (recall that node-types are likely constant within a fab network). The engineer selects, in this example, the product node "PART," the lot level node "ALL LOT", the testing data type, or node "CP" (circuit yield), the time node "WEEK" and process node "NONE". The engineer wants to see the weekly average CP data for all the lots for the product type PART. Note that in this example the probe process itself is of no interest to the engineer in this analysis, therefore, the process type is not applicable, and the value NONE is used.

URM 318 looks to the EDA tools to find an analysis tool that matches the analysis objective of the engineer by using URM ontology module 318. KECAO system may form a data table linking each EDA tool to an identifier. URM ontology module 318 looks for matching nodes for each node-type that has been predefined for EDA tools. In this example, the EDA tool "weekly yield trend chart" 313 is the EDA tool identifier for the matching EDA tool, matching the engineer's analysis objective criteria of PART, ALL LOT, CP, WEEK, and NONE. Therefore, URM module 318 returns the weekly yield trend chart 306 link to the engineer's computer 304. In some cases, more than one EDA analysis tool link may be returned to the engineer. The engineer may then choose an EDA analysis tool to view or more likely view all of the EDA analysis tools.

Figure 4:
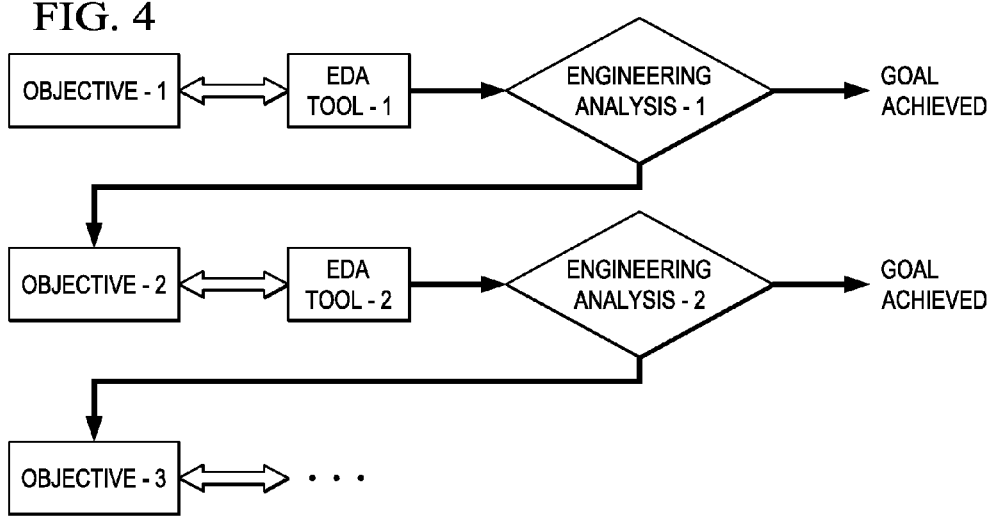
In FIG. 4 a chart of an engineering analysis process is presented in accordance with an embodiment.

Referring next to FIG. 4, a chart of an engineering analysis process is presented. In an illustrative embodiment, the analysis may be accomplished using a KECAO system, such as KECAO system 101 in FIG. 1. A first analysis objective, objective-1 is determined by the engineer. The URM module matches objective-1 to an EDA tool-1, as shown in the example illustrated in FIG. 3. Next, the engineer views EDA tool-1 and analyzes the information provided by EDA tool-1. In some cases there may be more than one EDA tool to analyze for a particular objective. The engineer may decide that the analysis objective has been met and end the analysis (goal achieved), or the engineer may decide to do further analysis by adding an additional objective, objective-2. The URM module matches objective-2 to an EDA tool-2. The engineer views EDA tool-2 and analyzes the information provided by EDA tool-2. The engineer may decide that the analysis objective has now been met and end the analysis, or the engineer may decide to do further analysis continuing as indicated. The KECAO system through the URM module gleans the analysis skill cumulated by engineering use of the EDA tools by storing the engineering objective and the tool used to analyze the objective. The function of gathering and storing the analysis information may all be done in the background without user initiation or further action by the user.

Further, by implementing an APTG module, such as APTG module 119 in FIG. 1, a KECAO system may build and maintain the cumulative results of the engineering use of objectives into the APTG module. The APTG module may also work offline, gathering, building, and storing analysis trees for further use with an objective. Thus, each engineer can benefit from the pre-formed planning trees created from the engineering analysis skills of the engineering group. In an illustrative embodiment, an extraction algorithm extracts the procedural knowledge from engineers' event log data.

Figure 5:
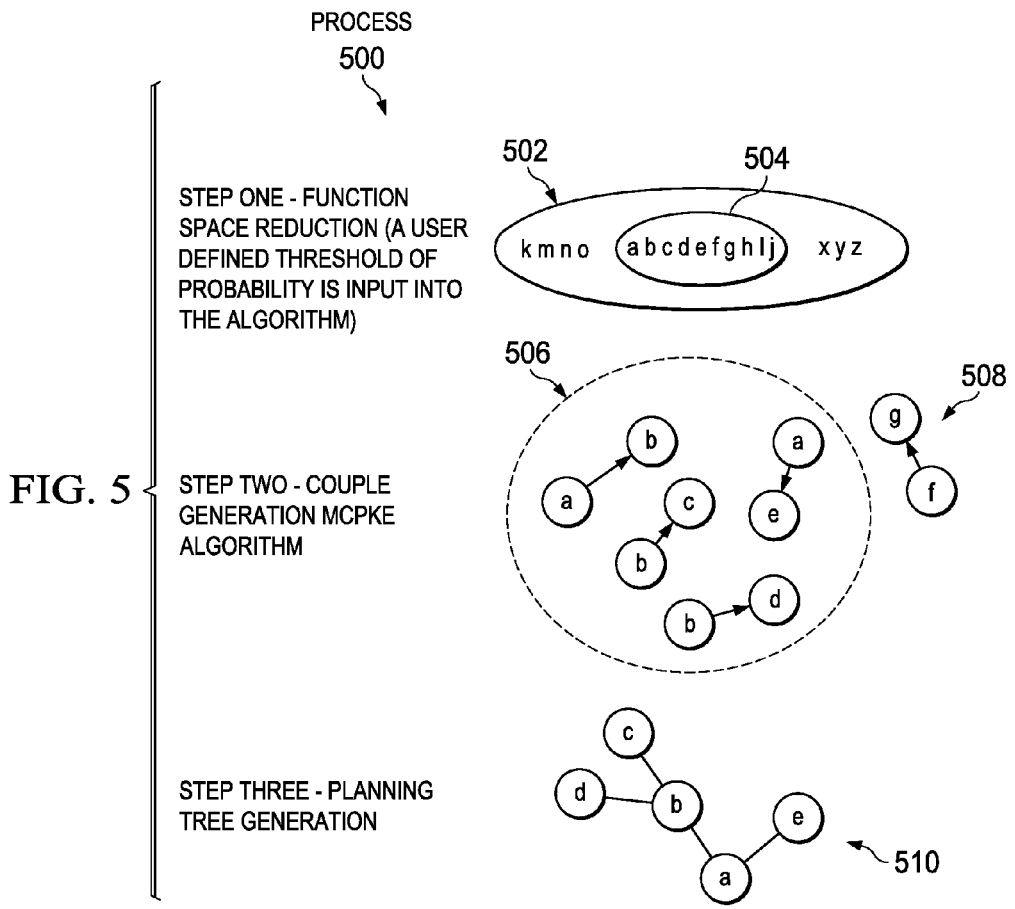
In FIG. 5 an APTG module, such as APTG 119 in FIG. 1, is further described in accordance with an embodiment.

Turning to FIG. 5, an example of APTG function, process 500, is presented. By modeling each application of an objective as a state, sequential tool applications as state transitions, and engineering preferences as state transition probabilities, the analysis processes of applying objectives to an analysis plan are modeled in the APTG module as an analysis planning tree (APT).

Process 500 comprises three steps. The first step uses function space reduction and classification. Initial function space 502 is comprised of possible objective states such as objective states: k, m, n, o, a, b, c, d, e, f, g, h, i, j, x, y, z. Initial function space 502 may include many objective states that are infrequently used. User defined thresholds of probability may be supplied as a general system parameter or in other embodiments thresholds of probability may be supplied at each step by the user.

The first step of process 500 eliminates many of the objective states that are rarely used and would have low reusability, forming a smaller function space 504 comprised of the frequently used objective states a, b, c, d, e, f, g, h, i, j. Typically, whether an objective state is "rarely used" or "frequently used" is determined by a user defined threshold. Process 500 may then segment initial function space 502 into further sub-spaces (not shown in FIG. 5) by node-types or groups of nodes within a node-type. For example, process 500 may segment initial function space 502 into one space containing objective states pertaining to functions having nodes of CP and bin data and another space that involves objective states pertaining to functions having nodes of WAT and INLINE. Because of the functions of step one, the knowledge extraction may be focused on the application procedure of the frequently used objective states and functions, therefore not wasting any resource time on improbable objectives.

The second step of process 500 employs a Markov chain based procedural knowledge extraction (MCPKE) algorithm as a function couple generator. Treating applications of objectives as states, the state transition probability is computed between one function and its preceding functions as a Markov chain. In a Markov chain, the present state captures all the information that influences the future process. Future states will be reached through a probabilistic process instead of a deterministic one. Thus drawing from the smaller function space 502, couples of objective states are formed. The couples are formed and assigned a probability of usage percentage (not shown in FIG. 5). For example, the engineering event log shows that engineers have progressed to objective b, following objective a, and that engineers have progressed to objective g following objective f. Note that the couples are directional, in other words, engineering may not have progressed to objective a, following objective b. An example of the directional aspect of the couples is that an engineer is not likely to progress to the objective of detailed site level data of a lot, objective k, if that engineer had not first had the objective of the more general wafer level data of that lot, objective j. The couple would be weighted more heavily j→k, than k→j. Further, while not shown in this simple example three or more objectives may form a Markov chain.

The third step of process 500 is objective function flow composition. From the generated objective couples, objective flows may be composed by starting with a couple as a flow and sequentially linking a new couple to the existing flow, through a common function, until no couples can be considered. In the example shown, couple a-b is linked to couple b-c through common function b, and couple a-e is linked to couple a-b, through common function a. Group of couples 506 are the couples used in objective flow 510. Not all of the functions will be linked into each flow. Note couple 508, there is no function in couple 508 that is common to any function in objective flow 510. However, each of the applicable flows (or single objectives) for an objective, will be presented to the user. Thus, couple 508 is not joined to objective flow 510, but will be presented to the user. Process 500 stores APT flows in an APTG module, such as APTG 119 in FIG. 1.

Referring next to FIG. 6, a representation of an analysis planning tree APT 602 is shown. The initial analysis objective of the engineer acts as the root of the tree, objective-1. An APTG module, such as APTG module 119 in FIG. 1, then finds an objective planning tree associated with Objective 1. The URM maps the subsequent objectives to their respective EDA tools in the URM module, linking each objective with at least one EDA tool. The KECAO system returns a link to the initial EDA-tool to the engineer (not shown) plus links analysis planning tree (APT) 602 to the engineer, in other cases more than one APT may be presented to the engineer. APT 602 shows the additional objectives formed by experienced engineers that initially had the same objective-1.

Probabilities, such as 604, 606, 608 and 610, are determined by an APTG module based, in part, by the relatively frequency of which engineering accessed the EDA tool after the EDA tool was first accessed. Thus, upon viewing the information provided by an APTG module, 27% of the engineers executed EDA tool-1, analyzed its output, and formed a new objective, objective-3. 15% of the engineers, with Objective-1, analyzed EDA tool-1 and formed a new objective, objective-2. Since there is no further objective shown following objective-2, engineering typically finished their analysis upon viewing the Objective-2 EDA link(s).

However, upon viewing information associated with objective-3, 30% of the engineers formed a new objective objective-5, and 61% of the engineers formed new objective, objective-4. Following objective-4 engineers typically reached their objective, ending their analysis. In this way, an analysis planning tree is presented to the engineer. The benefits of APT are obvious. The engineer is able to quickly find and view the pertinent tools even if the engineer is relatively inexperienced, thus saving time and perhaps costly errors caused by missing a key piece of information.

A further prior art disadvantage is that analysis made by an engineer is not stored for reuse. One of the reasons the analysis is not stored, is the difficulty in categorizing the analysis. A graphic symptom capturer (GSC) is employed by KECAO system to solve this difficulty.

An example of a translation implemented by a GSC module is shown in FIG. 7. EDA tool, in example chart 700 has six data points (area 708) selected by an engineer. Area 708 is translated into symptom text by a GSC module (not shown). GSC, such as GSC 120 in FIG. 1, is designed to enable engineers to directly select the symptom patterns they perceive on the EDA graphic charts they analyze. The graphic symptom patterns are then translated into text descriptions by a software interpreter for knowledge storage and sharing.

In this example, chart 700 has a y-axis 704 indicating mean CP data values and an x-axis 706 indicating the week of the year, week number. Upon selecting the data of interest in this example area 708, a GSC module translates 701 with the help of the URM module (not shown). The symptom (as shown in area 708) is translated into the text 702—"Multi week mean yield trend down." This can be determined, e.g., by trend line analysis, curve fitting algorithms, or the like.

Turning to FIG. 8, GSC 800 has a three-layered symptom capture design illustrated by block diagram 800. Data characteristic identification (DCI) layer 802 identifies the characteristics of the data items selected by engineers, such as data 708 in FIG. 7. Frequently used vocabularies and syntaxes of engineers are collected for symptom descriptions. The collected vocabularies are then stored into a database as a symptom vocabulary table (SVT) 804. SVT 804 is based on a URM model, which uses the words frequently employed by engineers as nodes to engineering objectives and EDA data.

Symptom vocabulary selection layer (SVS) 806 takes the output message of DCI layer 802 as statements, then queries the corresponding vocabularies from the symptom vocabulary table using the symptom syntaxes (SS) 810, 812, and 814 (described below). Similarly, symptom syntaxes 810, 812, and 814 are constructed for using the vocabularies in symptom vocabulary table 804 to describe symptoms.

The symptom description language comprises a unit of language called a "sentence," which comprises sentence structure and word classes (not shown in FIG. 8). Word classes are the categories of vocabularies that combine to construct sentences. The position of each vocabulary in a sentence must be arranged according to a sentence structure. The principles governing the sentence structure are defined as the symptom syntaxes (SS); single line single data SLSD 810, single line multiple data SLMD 812, and multiple line multiple data MLMD 814 in symptom composition layer (SC) 808. Symptom syntaxes (SS) are described further below.

Turning to FIG. 9, an example of three symptom syntax types are shown. Symptom syntaxes such as symptom syntaxes 810, 812, and 814 in FIG. 8 are illustrated. The weekly yield trend chart shows three curves or data lines 902, 904, and 906. The symptom syntax single data single line (SDSL) is indicated by area 910. The single data single line syntax indicates a single data point on a single line, in this case line 906. As can be seen, this point represents "outlying" data that is aberrant relative to the trend for line 906. Such an aberrant data point might represent a condition that could significantly impact yield and/or performance, but as a single data point, is more likely to be a statistical fluke or random variation. The symptom syntax multiple data single line (MDSL) is indicated by area 912. The multiple data single line syntax indicates multiple data points on a single line, in this case line 906. By contrast with area 910, this MDSL area 912 is more likely to be a trend rather than a statistical fluke because it is supported by multiple data points. An engineer would hence recognize this as being a condition upon which to focus more attention for further analysis. The symptom syntax multiple data multiple line (MDML) is indicated by area 914. The multiple data multiple line syntax indicates multiple data points on multiple lines, in this case lines 904 and 906. Comparing trend lines for multiple symptom types can demonstrate potential relationships (e.g., cause and effect relationships) between symptoms and/or isolate root causes.

Figure 10:
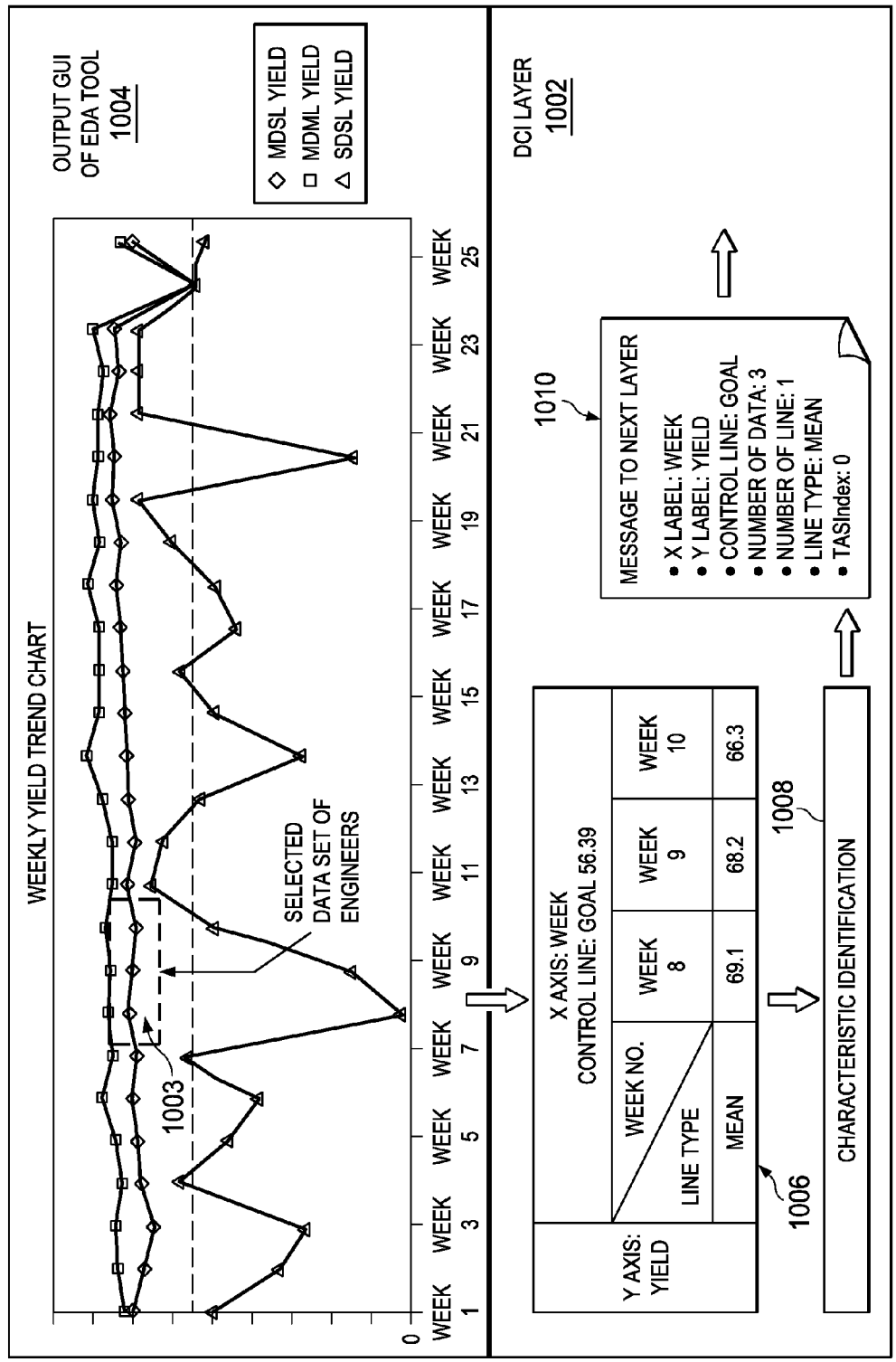
FIG. 10 illustrates example symptom syntax types, such as multiple data single line (MDSL), multiple data multiple line (MDML), and single data single line (SDSL)
Figure 11:
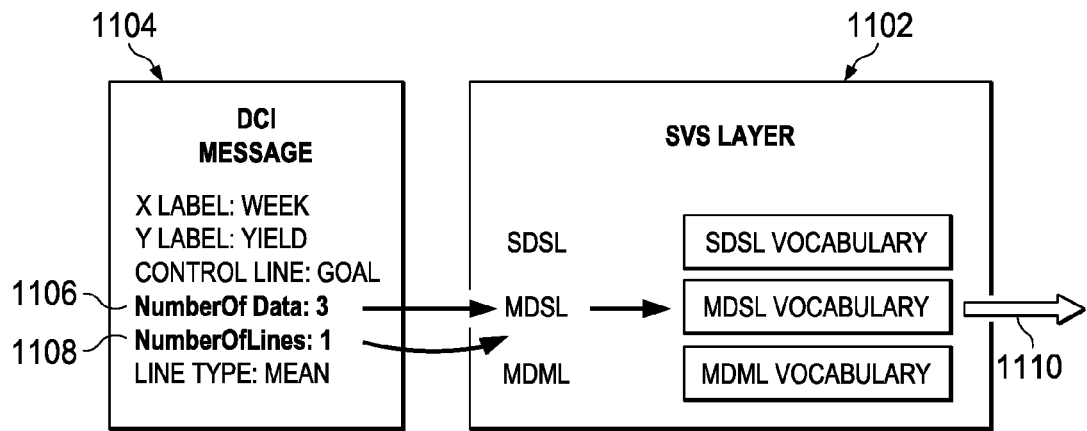
FIG. 11 depicts a procedure of a symptom vocabulary selection (SVS) layer, such as SVS layer 806 in FIG. 8 in accordance with an embodiment.

FIG. 10 illustrates a function of DCI layer 1002, illustrating a specific embodiment of a DCI layer, such as DCI layer 802 shown in FIG. 8. Output graphic user interface (GUI) of EDA tool 1004 is a chart of the Weekly yield trend. The selected data set of the engineer is illustrated in area 1003. The DCI layer identifies the characteristics of the data items selected by engineers. The X axis is identified as "week," the Y axis as "yield," the control line is in this case the "goal," the number of data selected is "3," the number of lines selected is "1," and the line type selected is the "mean." The actual data selected is represented by chart 1006 and the DCI layer does a characteristic identification 1008 and sends a message to the next layer as illustrated in box 1010, shown in part below:

X label: week
Y label: yield
Control line: Goal
Number of data: 3
Number of line: 1
Line type: mean FIG. 11 depicts a procedure of a symptom vocabulary selection (SVS) layer 1102, illustrating a specific embodiment of an SVS, such as SVS 806 schematically shown in FIG. 8. SVS 1102 takes the output message of DCI layer 1104 as statements. Then the symptom vocabulary selection layer queries the corresponding vocabularies from symptom vocabulary table via symptom syntaxes SDSL, MDSL, and MDML. SVS 1102 checks two items of DCI message, NumberOfData 1106 and NumberOfLine 1108 to select SVS method for querying vocabularies, which are sent to the next layer, symptom composition. In the example used in FIG. 10, NumberOfData 1106 is "3" and NumberOfLine 1108 is "1," therefore, the syntax selected is MDSL, and it is MDSL symptom vocabularies that will be chosen for the eventual symptom sentence. SVS 1102 sends the symptom vocabulary chosen to symptom composition layer 1110.

Figure 12:
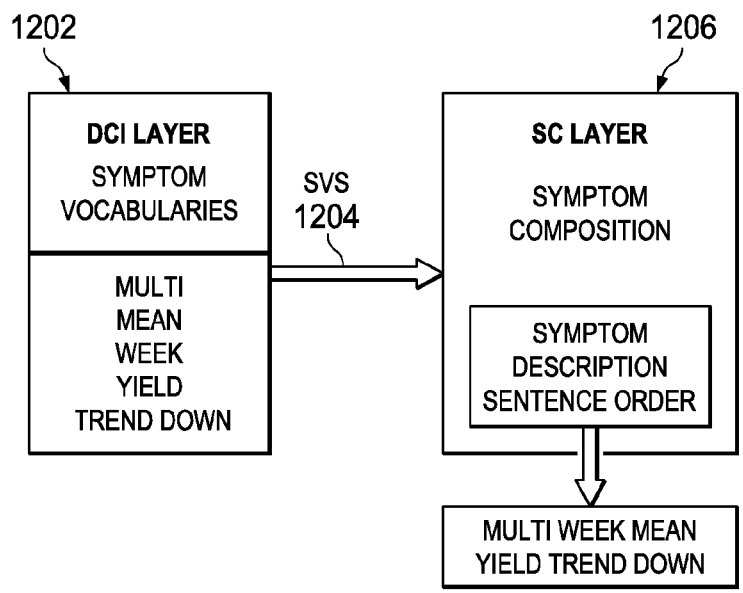
FIG. 12 depicts a data characteristic identification (DCI) layer, an SVS layer, and a symptom composition (SC) layer working in concert in accordance with an embodiment.

Turning to FIG. 12, DCI layer 1202, SVS layer 1204 and SC layer 1206 are shown working in concert. The symptom vocabulary is supplied by DCI layer 1202. SVS layer 1204 provides the symptom syntax to SC layer 1206. SC layer 1206 layer takes the selected vocabulary from DCI layer 1202 and locates each symptom "word" in the correct position for its syntax, forming text fault symptom 1208, which reads, "Multi week mean yield trend down."

Automatic summaries of analysis and results may be created using the URM, APTG, and GSC modules.

Although the illustrative embodiment and its advantages have been described in detail, it should be understood that various changes, substitutions, and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that node types or names may be varied while remaining within the scope of the present invention.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer program product, comprising: a tangible, non-transitory, computer-readable medium having encoded thereon instructions for use by at least one computer, wherein the instructions are for establishing a mapping function between engineering analysis objectives and engineering analysis tools, the computer program product comprising: computer usable program code defining a fault symptom language, the fault symptom language comprising a first symptom syntax selected from a plurality of symptom syntaxes and a first symptom vocabulary selected from a plurality of symptom vocabularies; computer usable program code implementing a user interface configured to collect the engineering analysis objectives in the fault symptom language; computer usable program code for assigning a respective identifier to each of the engineering analysis tools using the fault symptom language; computer usable program code for mapping the engineering analysis objectives to the engineering analysis tools; and computer useable program code for returning a link to the user interface, wherein the link points to the respective engineering analysis tools mapped to the respective engineering analysis objectives.

2. The computer program product of claim 1, wherein the fault symptom language further comprises:
    computer usable program code for defining node-types, each of the node-types describing a fault symptom category; and computer usable program code for defining a plurality of nodes, each node having a node-type.

3. The computer program product of claim 2, wherein the fault symptom language further comprises:
computer usable program code for selecting at least two node-types from the group consisting essentially of product-type, lot-level, measurement, time-frame, and process-type.

4. The computer program product of claim 3, wherein the fault symptom language further comprises:
computer usable program code selecting at least two nodes from the group consisting essentially of circuit probe data, bin data, wafer probe data, inline data, equipment data, and fault detection control data.

5. The computer program product of claim 2 further comprising:
computer usable program code for collecting the engineering analysis objectives which provides a user with each node-type and allows the user to provide a node for each node-type.

6. The computer program product of claim 2, further comprising a data table linking each of a plurality of engineering data analysis (EDA) tools to an EDA tool identifier, wherein a node for each node-type is specified within each EDA tool identifier.

7. The computer program product of claim 1, wherein the fault symptom language is based on a unified resource model.

8. The computer program product of claim 1 further comprising:
computer usable program code for an analysis planning tree generator (APTG), the APTG further comprising:
computer usable program code for a function space reduction algorithm, wherein an original function space comprises possible objective states and a reduced function space comprises probable objective states, wherein the probable objective states are those objective states which exceed a user defined threshold of probability;
computer usable program code for a function couple generator, wherein couples of objective states are formed according to a probability of a second objective state following a first objective state;
computer usable program code for composing an analysis planning tree from the couples of objective states; and
computer useable program code for a graphical user interface that displays at least one analysis planning tree in response to a user inputting an objective.

9. The computer program product of claim 8, wherein the function couple generator generates a Markov based chain.

10. The computer program product of claim 8, wherein the analysis planning tree comprises couples of engineering analysis objectives, wherein each of the couples of engineering analysis objectives are linked together by a common engineering analysis objective.

11. The computer program product of claim 8, wherein a probability of use is associated with each of the couples of objective states.

12. The computer program product of claim 11, wherein the probability of use is calculated by determining a number of historic events associated with an EDA tool identifier that is linked with an objective state.

13. The computer program product of claim 12, wherein the number of historic events are collected using a relative frequency of which a second EDA tool is accessed following a first EDA tool for the objective state.

14. The computer program product of claim 1 further comprising:
computer usable program code for a graphic symptom capturer (GSC), the GSC further comprising:
computer usable program code for receiving at least one point selection from an EDA tool;
computer usable program code for choosing fault symptom language that correlates with the at least one point selection;
computer usable program code for recognizing a symptom syntax in the at least one point selection; and
computer usable program code for composing a text sentence using the fault symptom language and the symptom syntax that describes the at least one point selection from the EDA tool.

15. The computer program product of claim 14, wherein the GSC further comprises:
computer usable program code for a symptom vocabulary table; and
computer usable program code for identifying a symptom syntax from the symptom vocabulary table.

16. An engineering analysis method comprising:
interfacing with a manufacturing system network;
establishing a mapping function between engineering analysis objectives and engineering analysis tools, wherein the mapping function comprises:
structuring a fault symptom language by selecting a first symptom syntax from a plurality of symptom syntaxes and selecting a first symptom vocabulary from a plurality of symptom vocabularies;
collecting engineering analysis objectives in the fault symptom language through a user interface;
assigning an identifier, comprised of the fault symptom language, to each engineering analysis tool;
mapping the engineering analysis objectives to respective engineering analysis tools; and
displaying, on the user interface, a link pointing to at least one engineering analysis tool that is mapped to a respective engineering analysis objective.

17. The engineering analysis method of claim 16, further comprising:
describing a fault symptom category using node-types; and
designating a plurality of nodes to a node-type.

18. The engineering analysis method of claim 16, wherein the fault symptom language further comprises:
node-types of product, lot-level, measurement, time, or process.

19. The engineering analysis method of claim 18, wherein the fault symptom language further comprises:
measurement nodes designating circuit probe data, bin data, wafer probe data, inline data, equipment data, null, or fault detection control data.

20. The engineering analysis method of claim 17, wherein the engineering analysis objective provides a user with each node-type and allows the user to provide a node for each node-type.

21. The engineering analysis method of claim 17, further comprising a data table linking each of a plurality of engineering data analysis (EDA) tools to a respective EDA tool identifier, wherein a node for each node-type is specified within each EDA tool identifier.

22. The engineering analysis method of claim 16, wherein the fault symptom language is based on a unified resource mode.

23. The engineering analysis method of claim 16 further comprising:

creating an analysis planning tree using an analysis planning tree generator (APTG), the creating of the analysis planning tree further comprising:

performing a function space reduction, wherein an original function space comprises possible engineering analysis objectives and a reduced function space comprises probable engineering analysis objectives, wherein the probable engineering analysis objectives are those engineering analysis objectives which exceed a user defined threshold of probability of use;

forming couples of engineering analysis objectives using a function coupling algorithm, wherein couples of the engineering analysis objectives are formed according to a probability of a second engineering analysis objective following a first engineering analysis objective; and forming the analysis planning tree using an analysis planning tree composer, wherein the analysis planning tree is formed from the couples of engineering analysis objectives, and wherein the user interface further accesses the APTG.

24. The engineering analysis method of claim 23, wherein the function coupling algorithm generates a Markov based chain.

25. The engineering analysis method of claim 23, further comprising:

a data table linking EDA tool function descriptions to engineering analysis objectives, wherein the EDA tool identifiers are mapped to the engineering analysis objectives before being coupled, resulting in coupled engineering analysis objectives.

26. The engineering analysis method of claim 16 further comprising:

auto-capturing engineering selected fault symptoms from a graphic symptom capturer (GSC), the auto-capturing further comprising:

identifying data in a data characteristic identification layer;

employing characteristic words passed from the data characteristic identification layer using a symptom vocabulary selection layer;

employing a symptom syntax, through a symptom composition layer, to order the characteristic words into a text sentence; and accessing the manufacturing system network and the GSC through a graphic user interface (GUI).

27. An engineering analysis method comprising:

interfacing with a manufacturing system network;

auto-capturing engineering selected fault symptoms from a graphic symptom capturer (GSC), the auto-capturing further comprising:

identifying data in a data characteristic identification layer;

employing characteristic symptom words passed from the data characteristic identification layer using a symptom vocabulary selection layer; and employing a symptom syntax, through a symptom composition layer, to order the characteristic words into a text sentence;

accessing the manufacturing system network and the GSC through a graphical user interface (GUI);

establishing a mapping function between engineering analysis objectives and engineering analysis tools, wherein the mapping function comprises:

structuring a fault symptom language by selecting a first symptom syntax from a plurality of symptom syntaxes and selecting a first symptom vocabulary from a plurality of symptom vocabularies;

collecting an engineering analysis objective in the fault symptom language through a user interface;

assigning an identifier, comprised of the fault symptom language structure, to each engineering analysis tool;

mapping the engineering analysis objective to an engineering analysis tool; and displaying, on the GUI, a link that points to the engineering analysis tool mapped to the engineering analysis objective.

\* \* \* \* \*